(12) United States Patent
Chu et al.

(10) Patent No.: US 9,281,681 B2
(45) Date of Patent: Mar. 8, 2016

(54) ESD PROTECTION CIRCUITS AND METHODS

(71) Applicant: Taiwan Semiconductor Manufacturing Co., Ltd., Hsin-Chu (TW)

(72) Inventors: Li-Wei Chu, Hsinchu (TW); Tzu-Heng Chang, New Taipei (TW); Yu-Ti Su, Tainan (TW); Jen-Chou Tseng, Jhudong Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 332 days.

(21) Appl. No.: 13/683,793

(22) Filed: Nov. 21, 2012

(65) Prior Publication Data

US 2014/0139958 A1    May 22, 2014

(51) Int. Cl.
*H02H 9/00* (2006.01)
*H02H 9/04* (2006.01)
*H02H 3/22* (2006.01)
*H02H 3/20* (2006.01)

(52) U.S. Cl.
CPC .................................... *H02H 9/046* (2013.01)

(58) Field of Classification Search
CPC .......... H01F 21/12; H01F 21/12; H02H 9/046
USPC .......................................... 361/56, 111, 91.1
See application file for complete search history.

(56) References Cited

U.S. PATENT DOCUMENTS

| | | | |
|---|---|---|---|
| 7,023,677 B2* | 4/2006 | Ker et al. | 361/56 |
| 7,057,488 B2* | 6/2006 | Van Haaren et al. | 336/200 |
| 7,335,955 B2 | 2/2008 | Mitra et al. | |
| 7,452,334 B2* | 11/2008 | Gianchandani et al. | 600/485 |
| 7,642,182 B2 | 1/2010 | Mitra et al. | |
| 2002/0013134 A1* | 1/2002 | Castillejo | H01F 17/0006 455/140 |
| 2006/0038635 A1 | 2/2006 | Richiuso et al. | |
| 2006/0197642 A1* | 9/2006 | Hargrove et al. | 336/200 |
| 2008/0072681 A1* | 3/2008 | Ruud | H01F 17/0006 73/735 |
| 2009/0121806 A1* | 5/2009 | Sasaki et al. | 333/174 |
| 2012/0146741 A1 | 6/2012 | Yen et al. | |

* cited by examiner

*Primary Examiner* — Thienvu Tran
*Assistant Examiner* — Lucy Thomas
(74) *Attorney, Agent, or Firm* — Duane Morris LLP (57) ABSTRACT

An electrostatic discharge protection circuit includes a first LC resonator circuit coupled to an input node and disposed in parallel with an internal circuit that is also coupled to the input node, and a second LC resonator circuit coupled in series with the first LC resonator circuit at a first node. The first LC resonator circuit is configured to resonate at a different frequency than a frequency the second LC resonator circuit is configured to resonate.

10 Claims, 7 Drawing Sheets

ESD PROTECTION CIRCUITS AND METHODS

FIELD OF DISCLOSURE

The disclosed circuits and methods relate to integrated circuits. More specifically, the disclosed circuits and methods relate to integrated circuits with improved electrostatic discharge (ESD) protection circuits.

BACKGROUND

Radio Frequency ("RF") circuits using Integrated Passive Device ("IPD") technology are becoming more and more prevalent. IPD technology is becoming more popular due to its ability to provide high-quality passive components compared to conventional complementary metal-oxide semiconductor ("CMOS") technology and the ability of IPD technology to reduce the area of the active silicon substrate for passive components. However, circuits formed using these processes are susceptible to damage due to ESD events. Therefore, ESD protection circuits are built onto the chip to protect the devices and circuits on the IC from ESD damage. ESD protection circuits are typically provided for input/output ("I/O") pads.

DETAILED DESCRIPTION

This description of the exemplary embodiments is intended to be read in connection with the accompanying drawings, which are to be considered part of the entire written description.

The disclosed circuits and methods can advantageously protect multi-band and wide-band circuits that are based on passive (IPD) or active (e.g., MOS, BJT, etc.) processes during electrostatic discharge ("ESD") events (e.g., zapping). The circuits can be realized with reduced layout area using a single inductor. Moreover, the disclosed systems and methods can be applied to local area networks ("LANs"), such as ETHERNET networks, to protect these devices from ESD events.

Figure 1A:
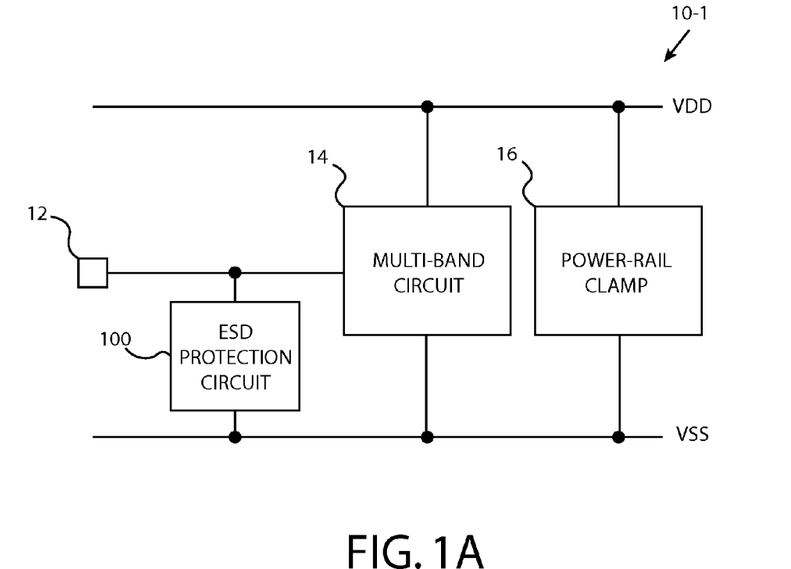
FIGS. 1A and 1B are block diagrams of integrated circuits including a multi-band circuit protected by one or more ESD protection circuits in accordance with some embodiments.

FIG. 1A is a block diagram illustrating one example of an integrated circuit 10-1 that includes an input node 12 that is coupled to a multi-band radio frequency ("RF") circuit 14. One or more ESD protection circuits 100 are coupled to input node 12 in parallel with multi-band protection circuit 14 and power-rail claim 16. ESD protection circuit 100 is configured to protect multi-band circuit 14 from ESD during an ESD event. In some embodiments, multi-band circuit 14 includes active devices (e.g., devices formed using one or more of MOS, BJT, etc. processing) and any DC signal is shorted to VSS through ESD protection circuit 100.

Figure 1B:
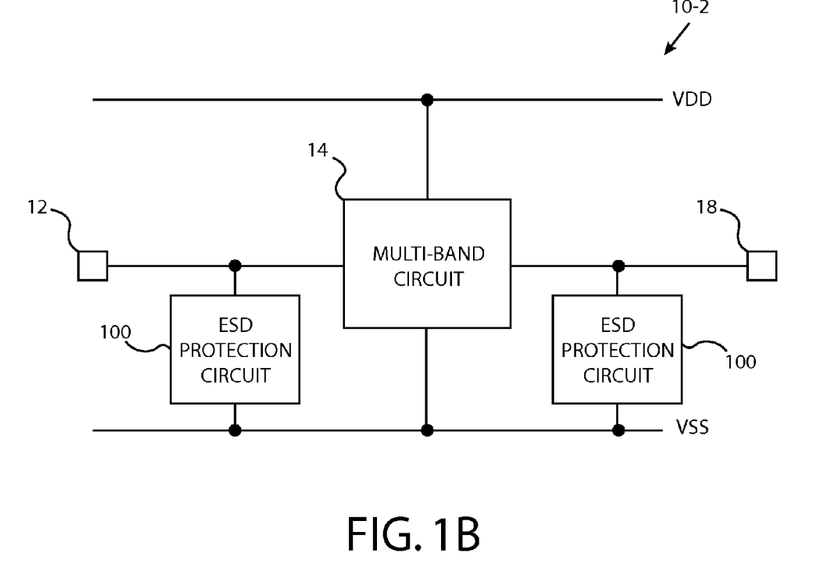

FIG. 1B is a block diagram of another example of an integrated circuit 10-2 configured with a pair of ESD protection circuits 100. As shown in FIG. 1B, integrated circuit 10-2 includes a first ESD protection circuit 100 coupled to input node 12 and to VSS such that ESD protection circuit 100 is disposed in parallel with internal circuit 14. A second ESD protection circuit 100 is coupled to output node 18 and to VSS such that ESD protection circuit 100 is coupled in parallel with internal circuit 14. In some embodiments, multi-band circuit 14 includes passive devices (e.g., devices formed using IPD processing).

Figure 2:
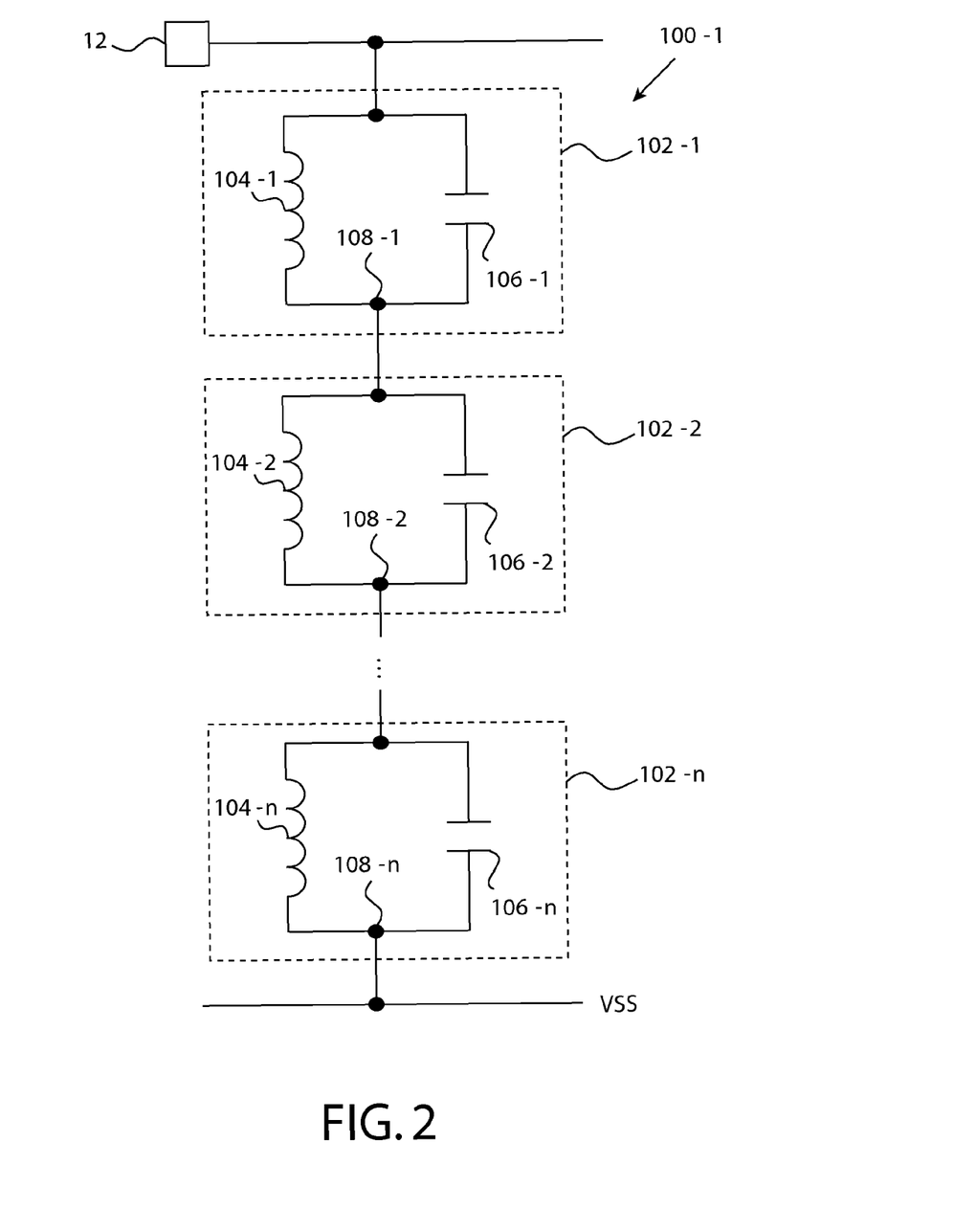
FIG. 2 is a circuit diagram of one example of a multi-band ESD protection circuit in accordance with the integrated circuit illustrated in FIGS. 1A and 1B.

FIG. 2 illustrates one example of an ESD protection circuit 100-1 in accordance with the integrated circuit 10 illustrated in FIGS. 1A and 1B. As shown in FIG. 2, ESD protection circuit 100-1 includes a number, n, of LC resonator circuits 102-1, 102-2, ..., 102-n (collectively "LC circuits 102" or "LC resonator circuits 102") coupled in series with each other between input node 12 and VSS. Each LC circuit 102 includes an inductor disposed in parallel with a capacitor. For example, LC circuit 102-1 includes inductor 104-1 disposed in parallel with capacitor 106-1 as inductor 104-1 and capacitor 106-1 are coupled together at source node 12 and at node 108-1.

Node 108-1 is also coupled to inductor 104-2 and capacitor 106-2 of LC circuit 102-2. Inductor 104-2 and capacitor 106-2 of LC circuit 102-2 are coupled together at node 108-1, which is coupled to the next LC circuit 102. LC circuit 102-n includes inductor 104-n and capacitor 106-n, which are coupled together at node 108-n that is also coupled to VSS. As will be understood by one of ordinary skill in the art, the value of n can be any integer greater than or equal to one.

Figure 3A:
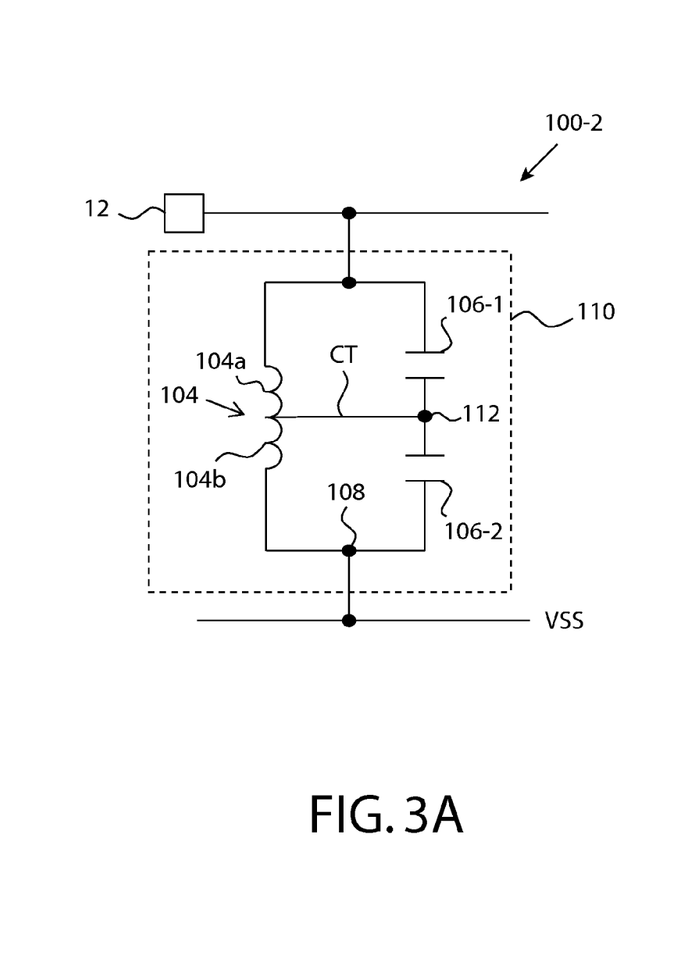
FIG. 3A is a circuit diagram of one example of a multi-band ESD protection circuit implemented with a single inductor.
Figure 3B:
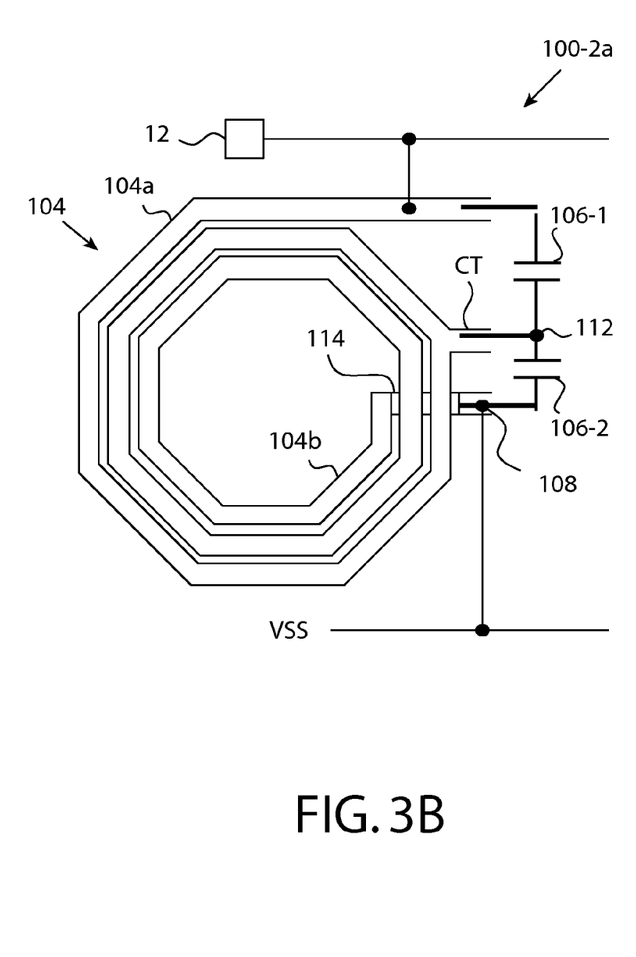
FIG. 3B is a partial layout view of one example of a single inductor coupled to a pair of capacitors in accordance with the multi-band ESD protection circuit illustrated in FIG. 3A.

FIGS. 3A and 3B illustrate another example of an ESD protection circuit 100-2 in accordance with the integrated circuit 10 illustrated in FIGS. 1A and 1B. ESD protection circuit 100-2 includes an LC circuit 110 comprising single inductor 104 coupled in parallel with a pair of capacitors 106-1, 106-2. Inductor 104 is coupled to input node 12 and to VSS and includes a center tap CT, which is coupled to node 112 disposed between capacitors 106-1 and 106-2. Center tap CT effectively divides the single inductor 104 into two portions: a first portion 104a disposed in parallel with capacitor 106-1, and a second portion 104b disposed in parallel with capacitor 106-2.

FIG. 3B is a perspective view of one example of an ESD protection circuit 100-2a in accordance with the embodiment illustrated in FIG. 3A. As shown in FIG. 3B, portion 104a of inductor 104 includes the outer portion of inductor 104 that extends between input node 12 to center tap CT where it is coupled to node 112. Portion 104b of inductor 104 includes the inner portion of inductor 104 extending from center tap CT, which is coupled to node 112, to node 108 that is coupled to VSS via connecting extension 114 that is disposed in a different metal layer than the rest of coil of inductor 104.

Figure 3C:
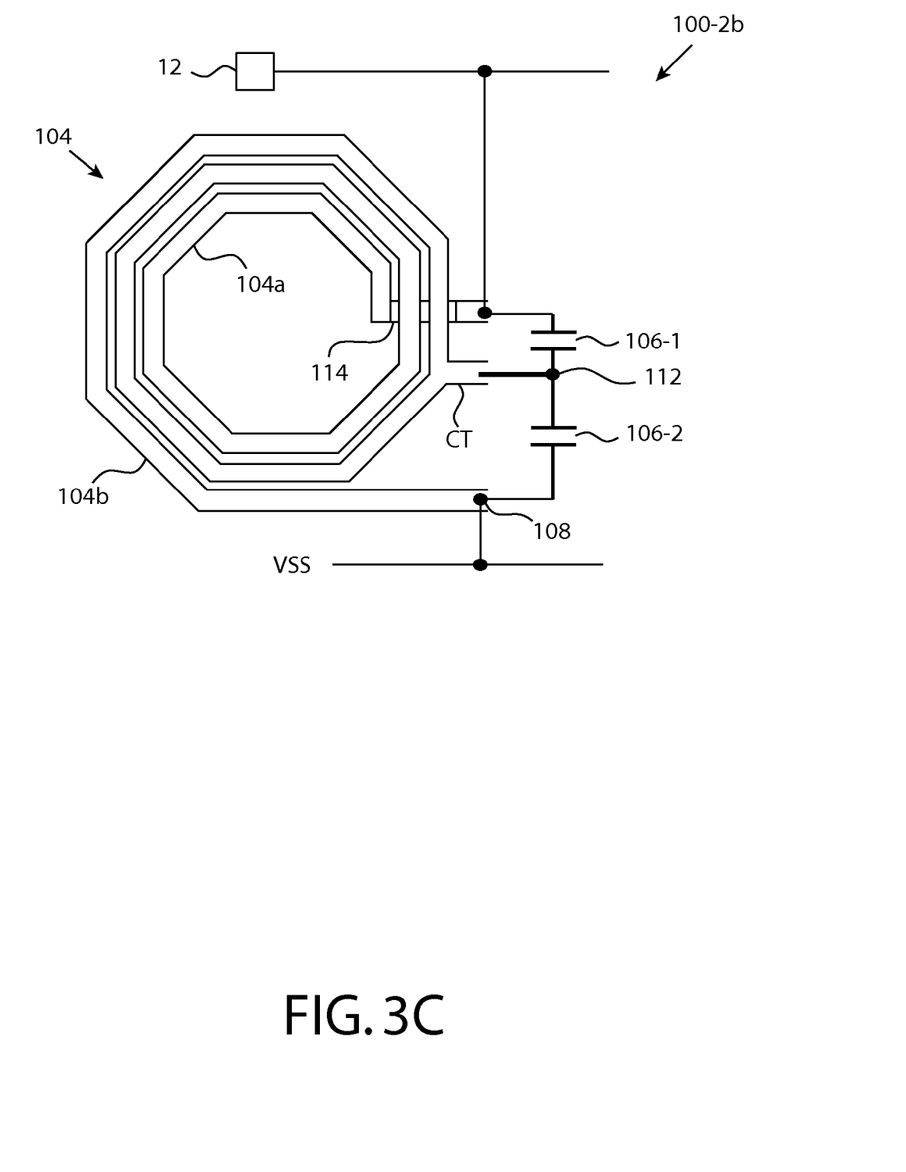
FIG. 3C is a partial layout view of another example of a single inductor coupled to a pair of capacitors in accordance with the multi-band ESD protection circuit illustrated in FIG. 3A.

One of ordinary skill in the art will understand that inductor 104 can be otherwise configured. For example, FIG. 3C illustrates another embodiment of an ESD protection circuit 100-2b in accordance with the embodiment illustrated in FIG. 3A. As shown in FIG. 3C, portion 104a of inductor 104 includes the inner portion of inductor 104 that extends between node 112 and input node 112, which is coupled to the inner portion of inductor via connecting extension 114 that is disposed in a different metal layer than the rest of inductor. Portion 104b of inductor includes the output of inductor 104 that extends between node 112 and node 108, which is coupled to ground.

As described above, in some embodiments, inductor 104 is formed primarily in a first metal layer with a connecting extension 114 disposed in a second metal layer disposed either above or below the first metal layer. However, one of ordinary skill in the art will understand that inductor 104 can be formed in more than two metal layers. Additionally, the number of center taps, CT, can be greater than one such that the single inductor 104 can be coupled to more than two capacitors 106.

Figure 4A:
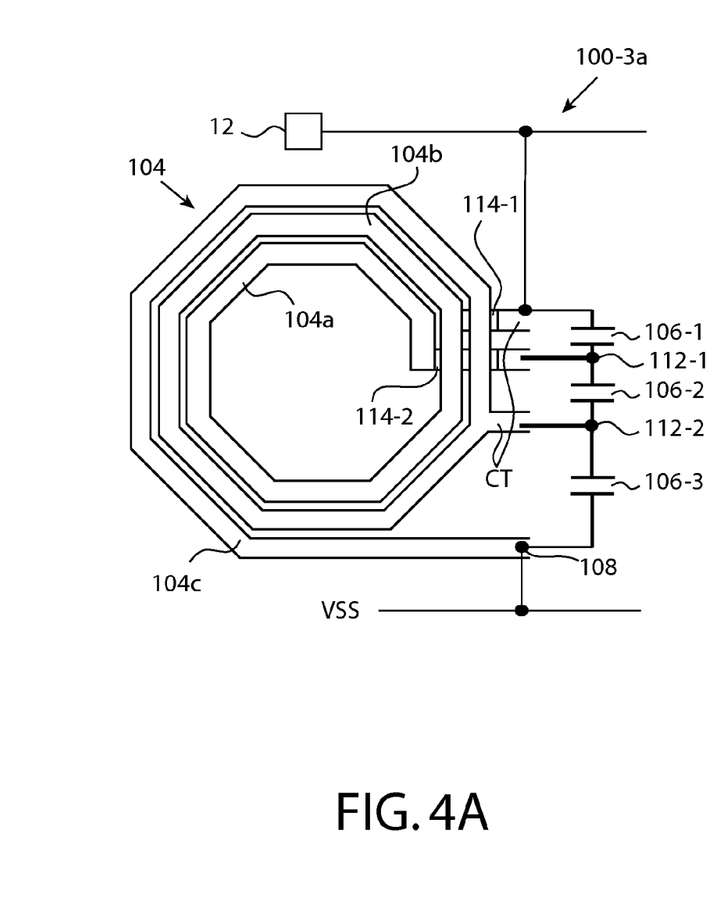
FIGS. 4A and 4B are partial layout views of other examples of a single inductor coupled to a plurality of capacitors in accordance with some embodiments.
Figure 4B:
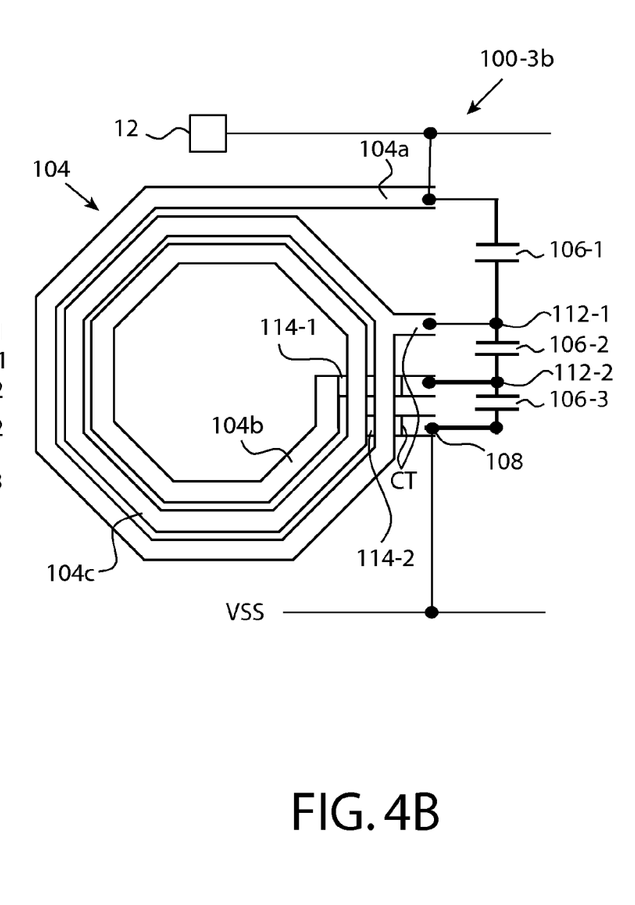

For example, FIGS. 4A and 4B illustrate other examples of ESD protection circuits 100-3a, 100-3b that include a single inductor 104 configured with a pair of center taps, CT, and coupled to three capacitors 106-1, 106-2, and 106-3. Referring first to FIG. 4A, ESD protection circuit 100-3a includes an inductor 104 divided into three portions 104a, 104b, and 104c. Portion 104a is coupled to input node 12 via connecting extension 114-1, which is disposed in a same metal layer as connecting extension 114-2 and a different metal layer than the remainder of inductor 104.

Portion 104a forms the inner-most portion of the coil forming inductor 104 and extends between input node 12 and node 112-1 such that portion 104a is disposed in parallel with capacitor 106-1. Portion 104a is coupled to nodes 12 and 112-1 by respective connecting extensions 114, which are disposed in different metal layers than the remainder of inductor 104. In some embodiments, both connecting extensions 114 are disposed in a common metal layer; however one of ordinary skill in the art will understand that connecting extensions 114 can be disposed in different metal layers.

Portion 104b forms the middle of the inductor 104 and extends between input node 12 and a center tap, CT, which is coupled to node 112-2. Portion 104c forms the outer-most portion of the coil forming inductor 104 and extends between node 112-2 and node 108, which is coupled to VSS, such that portion 104c is disposed in parallel with capacitor 106-3.

FIG. 4B illustrates another example of a single inductor 104 divided into a plurality of portions with each respective portion being disposed in parallel with a respective capacitor. As shown in FIG. 4B, ESD protection circuit 100-3b includes an inductor 104 divided into portions 104a, 104b, and 104c. Portion 104a forms the outer-most portion of the coil forming inductor 104 and extends between input node 12 and node 112-1.

Portion 104b forms the middle portion of the coil forming inductor 104 and extends between node 112-1 and node 112-2. Portion 104c forms the inner-most portion of inductor 104 and extends between node 112-2 and node 108. Nodes 112- and 108 are coupled to inductor 104 via respective connecting extensions 114, which are disposed in different metal layers than the remainder of inductor 104. In some embodiments, both connecting extensions 114 are disposed in a common metal layer; however one of ordinary skill in the art will understand that connecting extensions 114 can be disposed in different metal layers.

Figure 5:
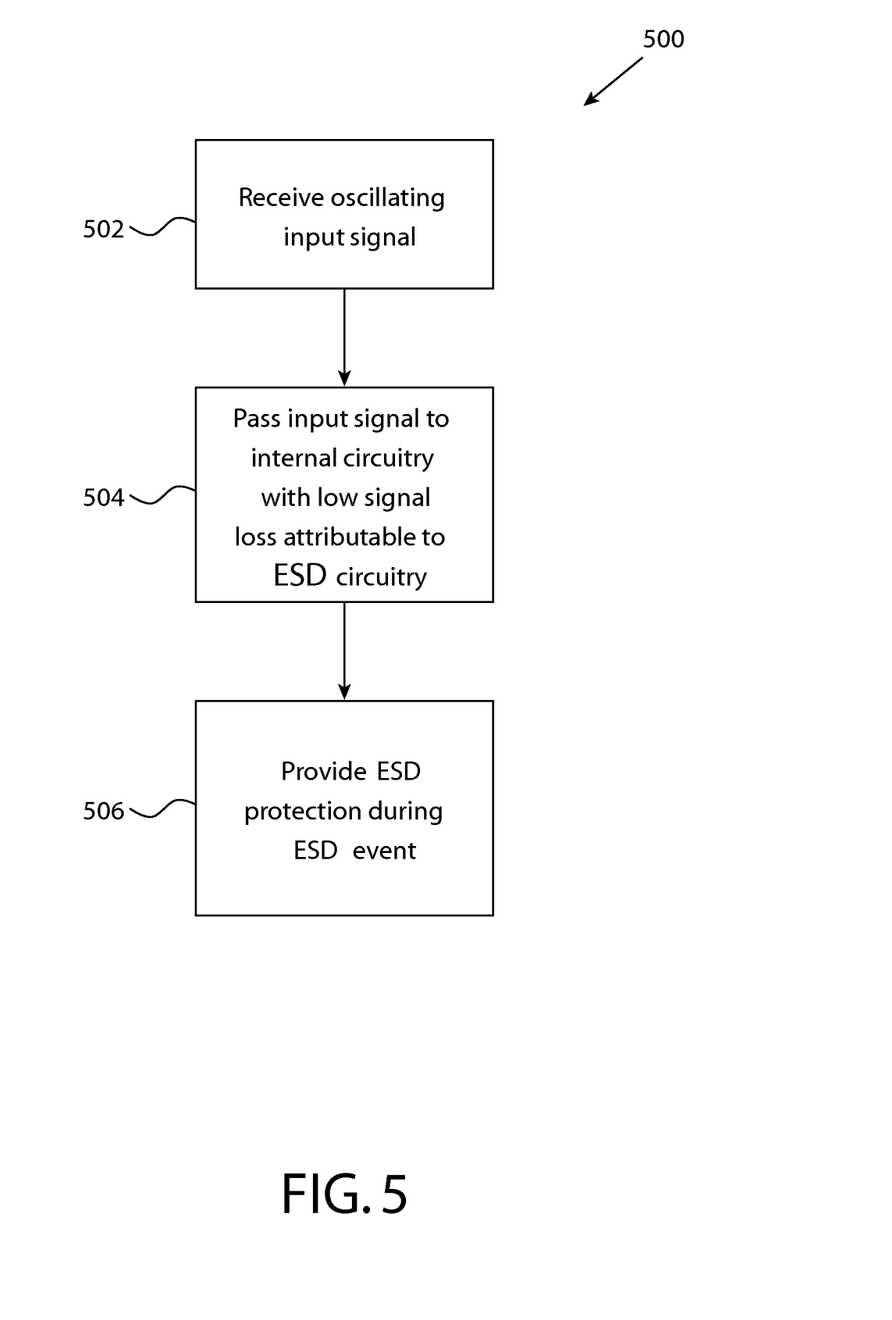
FIG. 5 is a flow diagram of one example of a method of providing ESD protection in accordance with some embodiments.

The operation of the integrated circuit 10 including a multi-band ESD protection circuit 100 is described with reference to FIG. 5, which is a flow diagram of one example of a method 500 of providing ESD protection. At block 502, an oscillating or periodic input signal (e.g., a radio frequency "RF" signal) is received at input node 12.

During normal operating within one of the plurality of bands defined by the plurality of LC resonator circuits 102, the oscillating input signal is passed to internal circuit(s) 102 with low signal loss attributable to ESD protection circuitry 100 at block 504.

At block 506, ESD protection circuitry 100 provides a pathway for ESD current to flow to ground away from internal multi-band circuit 14. As will be understood by one skilled in the art, the high current generated in response to an ESD event between power rails VDD and VSS is channeled away from internal circuit(s) by ESD protection circuitry 100.

Figure 6A:
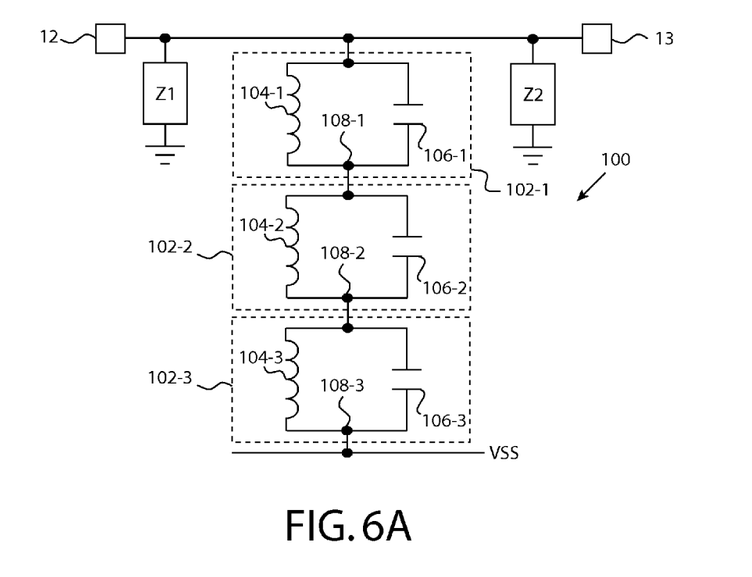
FIG. 6A is a circuit diagram of a multi-band ESD protection circuit that was simulated.
Figure 6B:
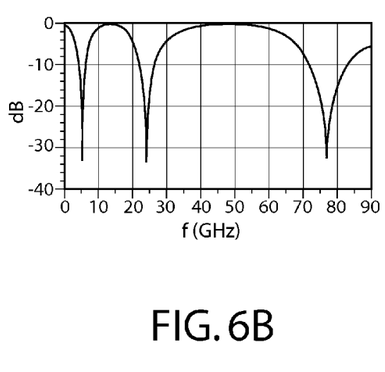
FIG. 6B is a graph of the reflectance experienced by the circuit illustrated in FIG. 6A during simulation.
Figure 6C:
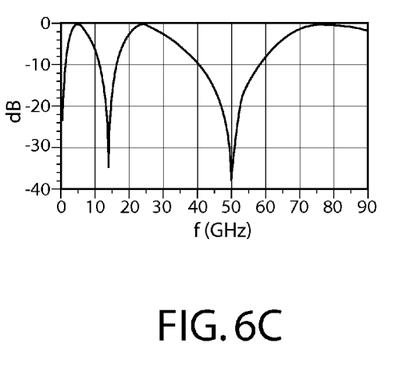
FIG. 6C is a graph of the insertion loss experienced by the circuit illustrated in FIG. 6B during simulation.

As described above, the multi-band ESD protection circuits disclosed above provide ESD protection for multi-band circuits without degrading signal performance. For example, FIGS. 6B and 6C are graphs illustrating the results of a simulation of an ESD protection circuit in accordance with the embodiment illustrated in FIG. 6A. The simulation results illustrated in FIGS. 6B and 6C were obtained by a simulating the response of the ESD protection circuit having the parameters set forth in Table 1.

TABLE 1

| Device | Value |
| --- | --- |
| 104-1 | L = 0.0215 nH |
| 106-1 | C = 0.2 pF |
| 104-2 | L = 0.088 nH |
| 106-2 | C = 0.5 pF |
| 104-3 | L = 1 nH |
| 106-3 | C = 1 pF |

The responses illustrated in FIGS. 6B and 6C were generated by simulating an RF input signal being applied to input node 12. The RF input signal had an initial frequency of 0.2 GHz and was increased by in steps of 0.2 GHz until the input signal had a frequency of 90 GHz. The impedances of input impedance block Z1 and output impedance block Z2 were set at 50 Q.

FIG. 6B illustrates the reflection of circuit 100-1 at input node 12 when the input signal was injected at node 12. As shown in FIG. 6B, an input signal of 5 GHz has a reflection of −33.135 dB, an input signal of 24 GHz has a reflection of −33.606 dB, and an input signal of 77 GHz has a reflection of −31.291 dB.

The insertion losses are illustrated in FIG. 6C, which measure the losses at output node 13 in response to an RF input signal injected at input node 12. As shown in FIG. 6C, the input signal of 5 GHz results in an insertion loss of −0.174 dB, an input signal of 24 GHz results in an insertion loss of −0.183 dB, and an input signal of 77 GHz results in an insertion loss of −0.198 dB.

Thus, the ESD protection circuit disclosed herein advantageously provides ESD protection with limited signal loss. Additionally, the ability of the ESD protection circuits to be implemented using IPD technology enables the ESD protection circuits to be implemented on a smaller area than through using other technologies. The small area is further reduced when a single inductor is implemented with multiple regions for use in a multi-band LC resonator.

In some embodiments, an electrostatic discharge protection circuit includes a first LC resonator circuit coupled to an input node and disposed in parallel with an internal circuit that is also coupled to the input node, and a second LC resonator circuit coupled in series with the first LC resonator circuit at a first node. The first LC resonator circuit is configured to resonate at a different frequency than a frequency the second LC resonator circuit is configured to resonate.

In some embodiments, a method includes receiving an oscillating signal at an input node coupled to an electrostatic discharge protection circuit. The electrostatic discharge circuit includes a first LC resonator circuit coupled to the input node in parallel with the internal circuit, and a second LC resonator circuit coupled in series with the first LC resonator circuit at a first node. The input signal is passed to a circuit coupled to the input node if the input signal has a frequency that corresponds to a frequency at which one of the first and second LC resonator circuits resonate, and a channel for current to flow away from the internal circuit is provided during an electrostatic discharge event.

In some embodiments, an integrated circuit includes an input node configured to receive a radio frequency signal, internal circuitry coupled to the input node, and a first electrostatic discharge protection circuit coupled to the input node and a first voltage supply. The first electrostatic discharge protection circuit is configured to protect the internal circuitry during an electrostatic discharge event. The first electrostatic discharge protection circuit includes a first LC resonator circuit coupled to the input node in parallel with the internal circuit, and a second LC resonator circuit coupled in series with the first LC resonator circuit at a first node. The first LC resonator circuit is configured to resonate at a different frequency than a frequency the second LC resonator circuit is configured to resonate.

Although the circuits and methods have been described in terms of exemplary embodiments, they are not limited thereto. Rather, the appended claims should be construed broadly, to include other variants and embodiments of the circuits and methods, which may be made by those skilled in the art without departing from the scope and range of equivalents of the circuits and methods.

What is claimed is:

1. An electrostatic discharge protection circuit, comprising:
   a first LC resonator circuit coupled to an input node and disposed in parallel with an internal circuit that is also coupled to the input node, the first LC resonator including
      a first portion of a single planar inductor coupled to the input node and to the first node, and
      a first capacitor coupled to the input node and to the first node such that the first capacitor is disposed in parallel with the first portion of the single planar inductor; and
   a second LC resonator circuit coupled in series with the first LC resonator circuit at a first node, the second LC resonator including
      a second portion of the single planar inductor coupled to the first node and to a second node, and
      a second capacitor coupled to the first node and to the second node such that the second capacitor is disposed in parallel with the second portion of the single planar inductor,
   wherein the first LC resonator circuit is configured to resonate at a different frequency than a frequency at which the second LC resonator circuit is configured to resonate, and a first connecting end portion of the first portion of the single planar inductor is disposed in a first metal layer and second connecting end portion of the second portion of the single planar inductor is disposed in a second metal layer, wherein the first connecting end portion does not contact the second metal layer and the second connecting end portion does not contact the first metal layer.

2. The electrostatic discharge protection circuit of claim 1, further comprising a plurality of additional LC resonator circuits disposed between the input node and a first power supply such that the plurality of additional LC resonator circuits are coupled in series with the first and second LC resonator circuits.

3. The electrostatic discharge protection circuit of claim 1, wherein the first and second LC resonator circuits are implemented using integrated passive device technology.

4. A method, comprising:
   receiving an oscillating signal at an input node coupled to an electrostatic discharge protection circuit and an internal circuit, the electrostatic discharge circuit comprising
      first LC resonator circuit coupled to the input node in parallel with the internal circuit, the first LC resonator circuit including
         a first portion of a single planar inductor coupled to the input node and to the first node, and
         a first capacitor coupled to the input node and to the first node such that the first capacitor is disposed in parallel with the first portion of the single planar inductor; and
      a second LC resonator circuit coupled in series with the first LC resonator circuit at a first node, the second LC resonator circuit including
         a second portion of the single planar inductor coupled to the first node and to a second node, and
         a second capacitor coupled to the first node and to the second node such that the second capacitor is disposed in parallel with the second portion of the single planar inductor;
   passing the input signal to a circuit coupled to the input node if the input signal has a frequency that corresponds to a frequency at which one of the first and second LC resonator circuits resonate; and
   providing a channel for current to flow away from the internal circuit during an electrostatic discharge event,
   wherein a first connecting end portion of the first portion of the single planar inductor is disposed in a first metal layer and a second connecting end portion of the second portion of the single planar inductor is disposed in a second metal layer, wherein the first connecting end portion does not contact the second metal layer and the second connecting end portion does not contact the first metal layer.

5. The method of claim 4, wherein the first and second LC resonator circuits are implemented using integrated passive device technology.

6. The method of claim 4, wherein the electrostatic discharge circuit includes a plurality of additional LC resonator circuits disposed between the input node and a first power supply such that the plurality of additional LC resonator circuits are coupled in series with the first and second LC resonator circuits.

7. An integrated circuit, comprising:
   an input node configured to receive a radio frequency signal;
   internal circuitry coupled to the input node; and
   a first electrostatic discharge protection circuit coupled to the input node and a first voltage supply, the first electrostatic discharge protection circuit configured to protect the internal circuitry during an electrostatic discharge event, the first electrostatic discharge protection circuit comprising a first LC resonator circuit coupled to the input node in parallel with the internal circuit, the first LC resonator circuit includes
    a first portion of a single planar inductor coupled to the input node and to the first node, and
    a first capacitor coupled to the input node and to the first node such that the first capacitor is disposed in parallel with the first portion of the single planar inductor, and
a second LC resonator circuit coupled in series with the first LC resonator circuit at a first node, the second LC resonator circuit includes
    a second portion of the single planar inductor coupled to the first node and to a second node, and
    a second capacitor coupled to the first node and to the second node such that the second capacitor is disposed in parallel with the second portion of the single planar inductor,
wherein the first LC resonator circuit is configured to resonate at a different frequency than a frequency the second LC resonator circuit is configured to resonate, and a first connecting end portion of the first portion of the single planar inductor is disposed in a first metal layer and a second connecting end portion of the second portion of the single planar inductor is disposed in a second metal layer, wherein the first connecting end portion does not contact the second metal layer and the second connecting end portion does not contact the first metal layer.

8. The integrated circuit of claim 7, further comprising a plurality of LC resonator circuits disposed between the input node and a first power supply such that the plurality of LC resonator circuits are coupled in series with the first and second LC resonator circuits.

9. The integrated circuit of claim 7, wherein the first and second LC resonator circuits are implemented using integrated passive device technology.

10. The integrated circuit of claim 7, further comprising a second electrostatic discharge protection circuit coupled to the input node and a second voltage supply, the second electrostatic discharge protection circuit configured to protect the internal circuitry during an electrostatic discharge event, the second electrostatic discharge protection circuit comprising
    a third LC resonator circuit coupled to the input node in parallel with the internal circuit, and
    a fourth LC resonator circuit coupled in series with the second LC resonator circuit at a second node,
    wherein the third LC resonator circuit is configured to resonate at a different frequency than a frequency the fourth LC resonator circuit is configured to resonate.

* * * * *